US007702134B2

(12) United States Patent
McAllister, Jr.

(10) Patent No.: US 7,702,134 B2
(45) Date of Patent: Apr. 20, 2010

(54) METHOD AND APPARATUS FOR IDENTIFYING THREE DIMENSIONAL COORDINATES ON A TIRE

(75) Inventor: Daniel McAllister, Jr., Akron, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 1173 days.

(21) Appl. No.: 11/292,989

(22) Filed: Dec. 2, 2005

(65) Prior Publication Data

US 2007/0127808 A1    Jun. 7, 2007

(51) Int. Cl.
*G06K 9/00* (2006.01)
*G01C 3/00* (2006.01)
*G01C 5/00* (2006.01)
*G09G 5/00* (2006.01)

(52) U.S. Cl. ............... 382/106; 382/108; 382/143; 382/144; 382/152; 382/153; 356/3; 345/582

(58) Field of Classification Search ......... 382/106, 382/108, 143, 144, 152, 153; 356/3; 345/382
See application file for complete search history.

(56) References Cited

U.S. PATENT DOCUMENTS

| 3,930,141 | A | | 12/1975 | Koyama et al. | 235/61.11 |
| 4,727,419 | A | * | 2/1988 | Yamada et al. | 382/141 |
| 2008/0255798 | A1 | * | 10/2008 | Buzan | 702/150 |

FOREIGN PATENT DOCUMENTS

| DE | 19946738 | * | 4/2000 |
| DE | 101 57 895 | | 7/2003 |
| DE | 20 2005 002 355 | | 6/2005 |
| DE | 20 2005 002 355 U1 | | 6/2005 |
| EP | 0 915 328 | | 5/1999 |
| EP | 0 915 328 A2 | | 5/1999 |
| EP | 0 958 881 | | 11/1999 |
| EP | 0 958 881 A1 | | 11/1999 |
| EP | 1 437 672 | | 7/2004 |
| EP | 1 437 672 A2 | | 7/2004 |
| EP | 1 477 765 | | 11/2004 |
| EP | 1 477 765 A1 | | 11/2004 |
| WO | WO 2005/000714 | | 1/2005 |
| WO | WO 2005/000714 A1 | | 1/2005 |

OTHER PUBLICATIONS

European Search Report, completed Mar. 15, 2007.
European Search Report, completed Jul. 10, 2007.

* cited by examiner

*Primary Examiner*—Anand Bhatnagar
*Assistant Examiner*—Randolph Chu
(74) *Attorney, Agent, or Firm*—Richard B. O'Planick (57) ABSTRACT

A method and apparatus for identifying 3-D coordinates of a target region on a tire includes: taking a digital image of a tire; finding an edge of a tire bead using pixel brightness values from the tire image; calculating tire bead circle center and radius using a plurality of image pixels on the tire bead edge; and performing a pixel brightness search around the bead circumference using the bead circle's center and radius to identify the target area X, Y coordinates. The Z-coordinate and slope of the target area are determined from multiple point distance calculations across the region.

1 Claim, 11 Drawing Sheets

METHOD AND APPARATUS FOR IDENTIFYING THREE DIMENSIONAL COORDINATES ON A TIRE

FIELD OF THE INVENTION

The invention relates generally to a method and apparatus for identifying a three dimensional region on a toroidal body and, more particularly, three dimensional coordinates on a tire for subsequent laser engraving.

BACKGROUND OF THE INVENTION

It is industry practice for certain information pertaining to tire, such as tire size, brand identification, inflation requirements, etc. to be integrally molded into the tire during its manufacture. With the passage of the Transportation Recall Enhancement, Accountability, and Documentation (TREAD) Act, it is now a requirement that certain additional information be permanently incorporated into a tire; information that is not readily incorporated into a tire from the mold. For example, a new requirement is that the week/year of manufacture be integrally affixed to the tire in order to render certain its date of manufacture throughout the useful life of the tire. It is, however, impractical to comply with the new date code requirement by modifying the mold each week to mark the tires with the week/year of manufacture. To change a mold weekly to comply with the date code requirement of Tread Act would be unduly burdensome and would add significantly to the cost of tire manufacture.

An alternative to incorporating such information into a tire is to engrave the information into the tire by laser in a post-cure operation. In addition to information necessary for compliance with the Tread Act, it could be beneficial to integrate other information such as plant and press identification for future reference.

In order for laser engraving to be employed in permanently incorporating reference information into a tire, the means for quickly, effectively, and efficiently locating three dimensional coordinates of the tire region to be engraved is necessary. Prior techniques have centered on the use of line scan cameras that require both the tire to be chucked on a spindle and a camera mounted at a comparatively close distance. The line scan camera uses traditional edge-detection techniques to locate by edge-detection the entire image or region to be engraved. Such a technique requires an additional programmatic method to find the specific region of interest, undesirably adding a time consuming step in the tire manufacturing process.

A need accordingly exists for quickly, effectively, and efficiently locating three dimensional coordinates of the tire region to be engraved. The desired solution to the industry's need must avoid the use of edge-detection throughout an entire image and have a cycle time as short as practical. The methodology should expeditiously identify a specific region of interest through use of mathematical tools and avoid unnecessary edge detection steps.

SUMMARY OF THE INVENTION

Pursuant to one aspect of the invention, a method for identifying coordinates of a target region on a tire includes: taking a digital image of a tire; finding an edge of a tire bead using pixel brightness values from the tire image; calculating tire bead circle center and radius using a plurality of image pixels on the tire bead edge; performing a pixel brightness search around the bead circumference using the bead circle's center and radius to locate the target region; and performing a pixel brightness search of the target region to determine the X, Y coordinates of the target region. According to another aspect of the invention, the Z-coordinate of the target area is determined by use of a laser distance measuring device whereby establishing 3D coordinates for the target region. In another aspect of the invention, the target region slope may be calculated from Z-coordinate measurements. A preferred line of attack for an information inscribing device may thus be identified, the preferred line of attack being substantially normal to the calculated slope of the target region. Yet another aspect of the invention is to provide an apparatus for performing the claimed method.

BRIEF DESCRIPTION OF THE DRAWINGS

The invention will be described by way of example and with reference to the accompanying drawings in which.

DETAILED DESCRIPTION OF THE INVENTION

Referring to FIGS. 1-4, a robotic apparatus 10 is shown suitable for use in the practice of the subject invention and consistent with robotic technology commonly available to the industry. The apparatus 10 employs a multi-arm linkage formed by a generally horizontal arm 12 pivotally connecting to a generally vertical support arm 14. Support arm 14 is connected to a freestanding support base 16. At the remote free end of the arm 12 is a clamping mechanism 18. While shown in a functional configuration suitable for the invention, other robotic apparatus configurations may be employed if so desired. A drive assembly 20 is connected to the arm linkages 12, 14 and a flexible wiring conduit 22 extends control and power lines from the base 16 to the remote end of arm 12. As shown by FIGS. 1-4, the apparatus 10 incorporates multiple pivot axes for adjustment purposes. The arm 12 pivotally attaches to arm 14 by pin assembly 24 and the clamping end of arm 12 is pivotally coupled to the clamp mechanism 18 by pivot pin assembly 23. In addition, the arm 14 may be pivotally coupled to the base to allow repositionment of the clamp end 18 about multiple adjustment axes.

With reference to FIGS. 7, 8, 9, 10, and 11, a laser distance-measuring device (LDM) and engraving laser are attached to the clamp end 18. Laser 26 is of a type commercially available, such as, without limitation, the Model Polaris 250 laser sold by Lap Laser LLC located in Cincinnati, Ohio. Laser 27 is likewise of a type commercially available such as, without limitation, the Model Smartlase 110, sold by Markem Co., of Keene, N.H. In addition a digital camera 28 is employed, the camera having an optical axis centered within view range 30. A workstation is shown in FIGS. 7-11 to include the robotic apparatus 10 and a conveyor belt 32. Conveyor belt is driven by a drive motor 34 and conveys a series of tires 38 on a belt surface 36 below the robotic apparatus end 18. Tires 38 are structured conventionally to include a crown 40, a sidewall 42, a bead region 44, and a lower sidewall 46. As best seen from FIG. 12, a target region 48 is identified during manufacture of the tire 38. The region of interest is created preferably by using a metal blank serial tag in the tire mold instead of a serial tag containing the normal code marking. So manufactured, sufficient lighting directed on the cured tire will create a bright area on the image where the target region is located.

In general, it is conventional to employ a series of discrete regions spaced circumferentially on the lower sidewall 46 proximate to the bead region 44. The discrete regions are used for informational purposes. Molded into such regions is information relating to the tire, such as tire size, inflation specifications, manufacturing data, etc. In the enacted TREAD Act, there is a further requirement that every tire carry a date code within a specific additional region at a specific location on the tire. The designated region is the last appearing region in a clockwise direction following the series of regions carrying conventional information. The statutory requirement is for the placement of week/year of manufacture information in permanent fashion within the last appearing region, whether by molding the information in or by a post tire manufacturing operation such as engraving.

The challenges attendant molding in such date coded information was explained previously. Using an engraving procedure carries certain difficulties given that the target region is located on a sidewall radius. In order to automate the engraving procedure, therefore, it is important to devise a method for accurately identifying and locating the target region in three dimensions (3D).

Figure 12:
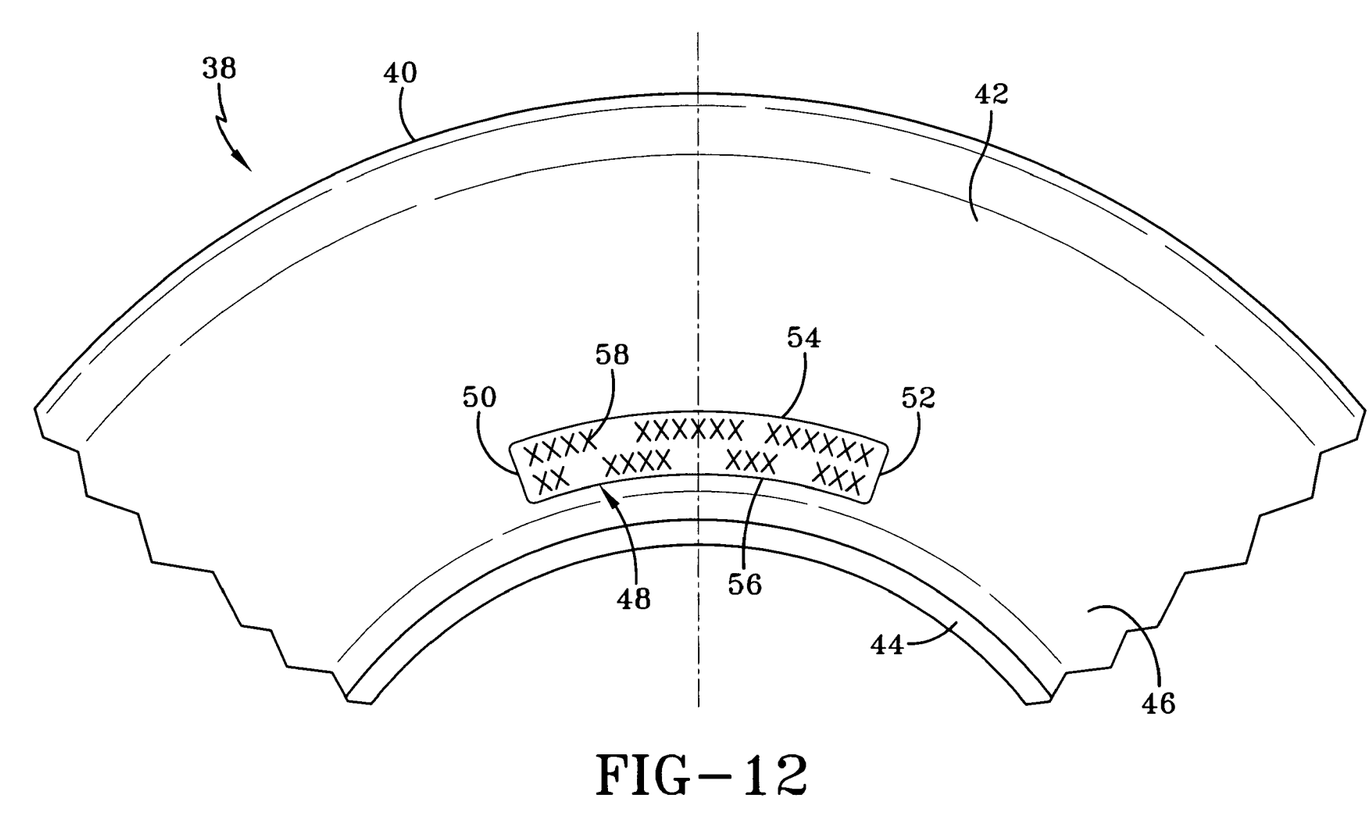
FIG. 12 is a plan view of a tire portion showing location of the target region and engraved information.

FIG. 12 illustrates a target region 48 on a lower sidewall of a tire 38. The region is generally a quadrilateral shape having rounded corners. The region is bounded by opposite ends 50, 52 and longitudinal sides 54, 56. Placed within the region 48 by suitably permanent means is information 58 required to comply with the requirements of the act and any other information deemed important to the manufacturer. For example, information identifying the equipment used to manufacture the tire may be encoded into the target region 48.

Figure 6:
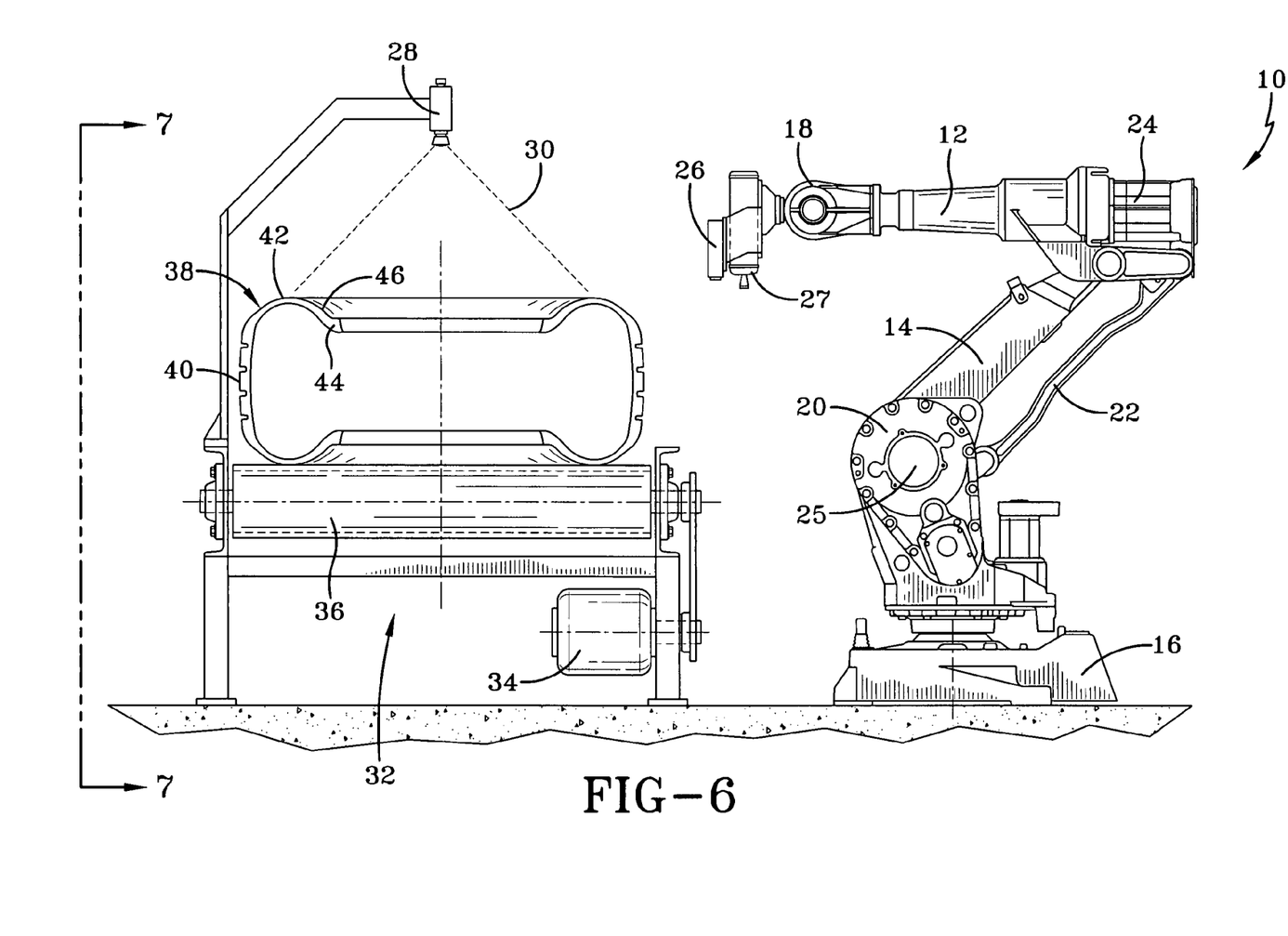
FIG. 6 is a side elevation view of the robotic apparatus, camera apparatus, and a tire conveyor station.
Figure 7:
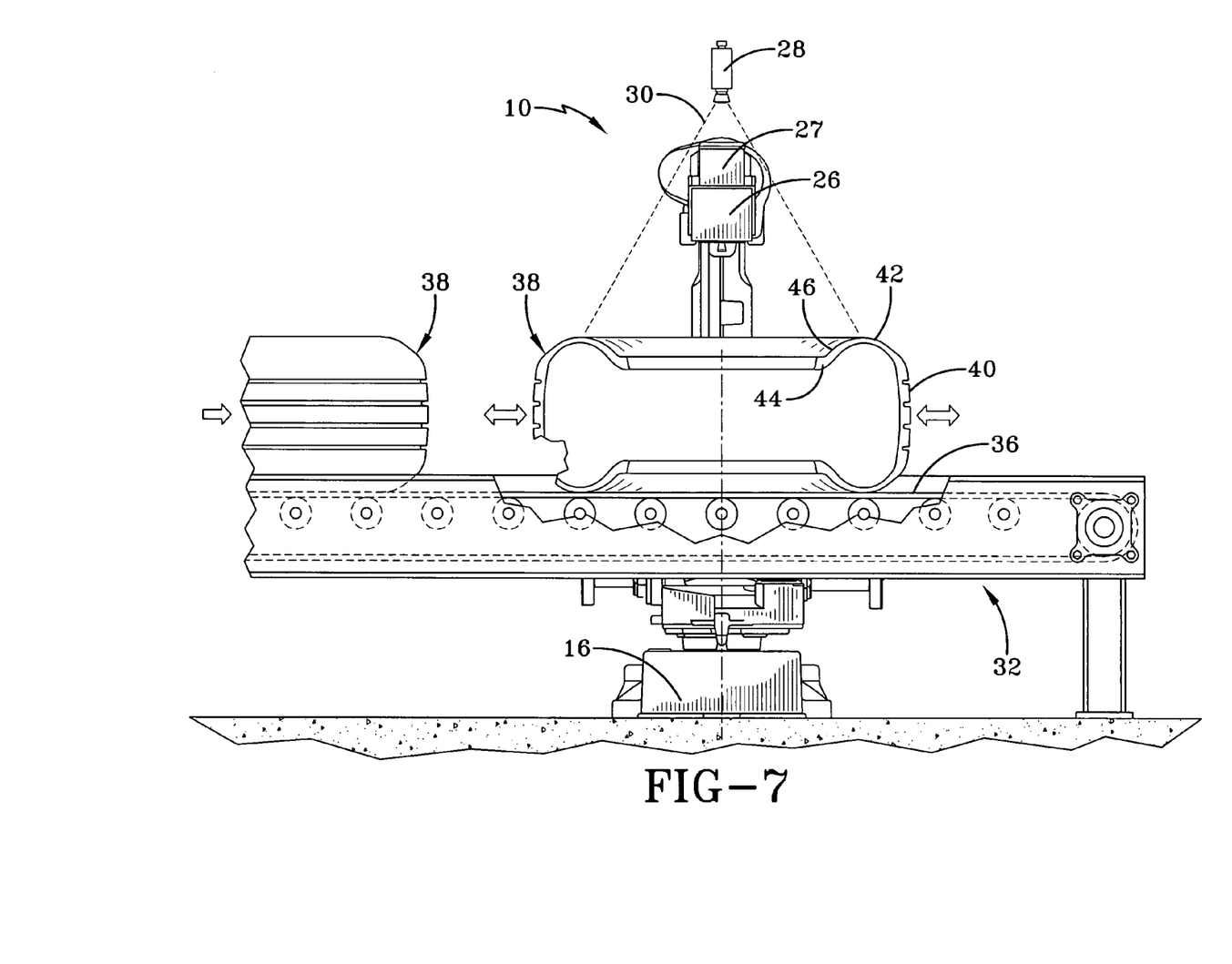
FIG. 7 is a side elevation view of a workstation comprising the conveyor station, the robotic apparatus, and the camera apparatus.
Figure 8:
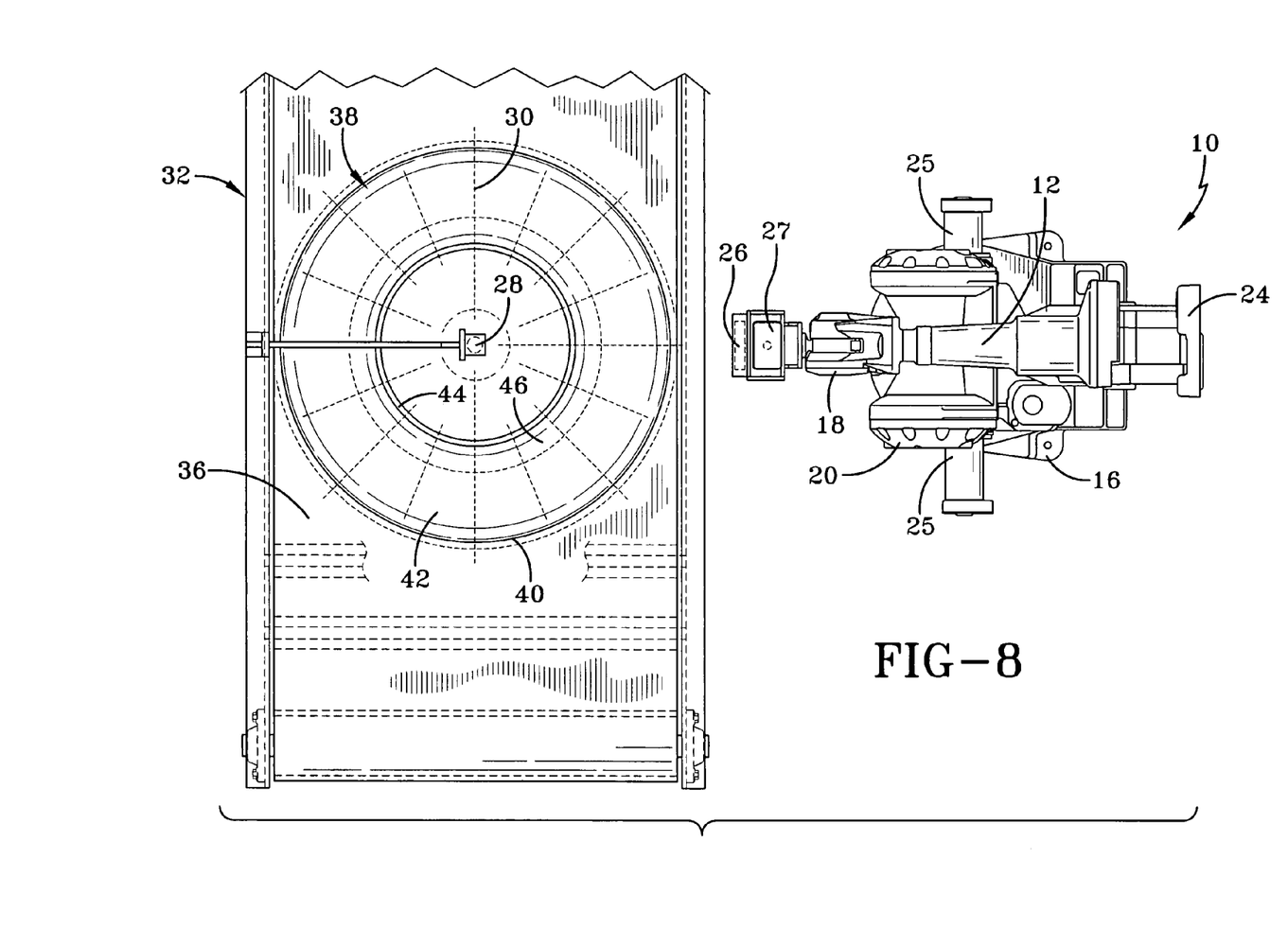
FIG. 8 is top plan view of the workstation with the camera assembly in position to capture an image of the tire.

With continued reference to FIGS. 6-11, the laser 26 emits a directional beam of light 60. As shown in FIG. 6, a target tire 38 is advanced by the conveyor system to a location beneath the digital camera 28. The centerline 62 of the tire is coincident with the optical axis of the camera 28. Camera 28, located on the centerline 62 at a fixed position above the conveyor and camera optical axis is oriented perpendicularly to the conveyor belt 32. The conveyor is stopped so that the center of the target tire coincides with the center of the camera image. The camera is spaced a known distance from the tire such that the field of vision 30 of the camera 28 covers the majority of the tire 38 sidewall. A digital image is taken of the entire tire by the camera 28 and image data is transmitted from the camera to a data processor for analysis. A computer-vision algorithm uses image pixel brightness values to find the edge of the tire bead 44. It will be appreciated that the brightness of the bead region is differentiated from surrounding regions of black tire so as to allow the computer to differentiate pixel brightness values.

Figure 9:
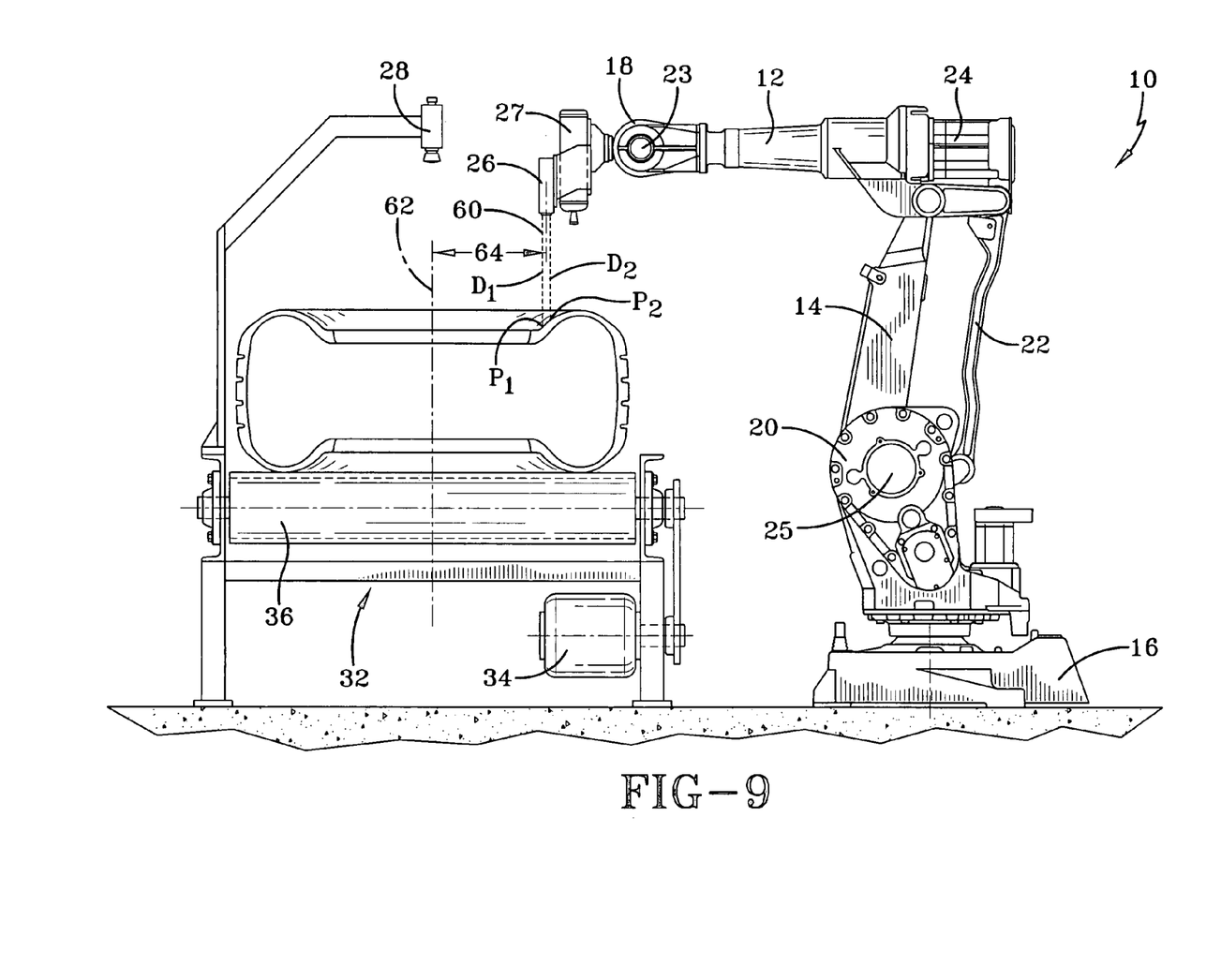
FIG. 9 is an end elevation view of the workstation showing the laser distance-measuring device measuring dual target region points.
Figure 10:
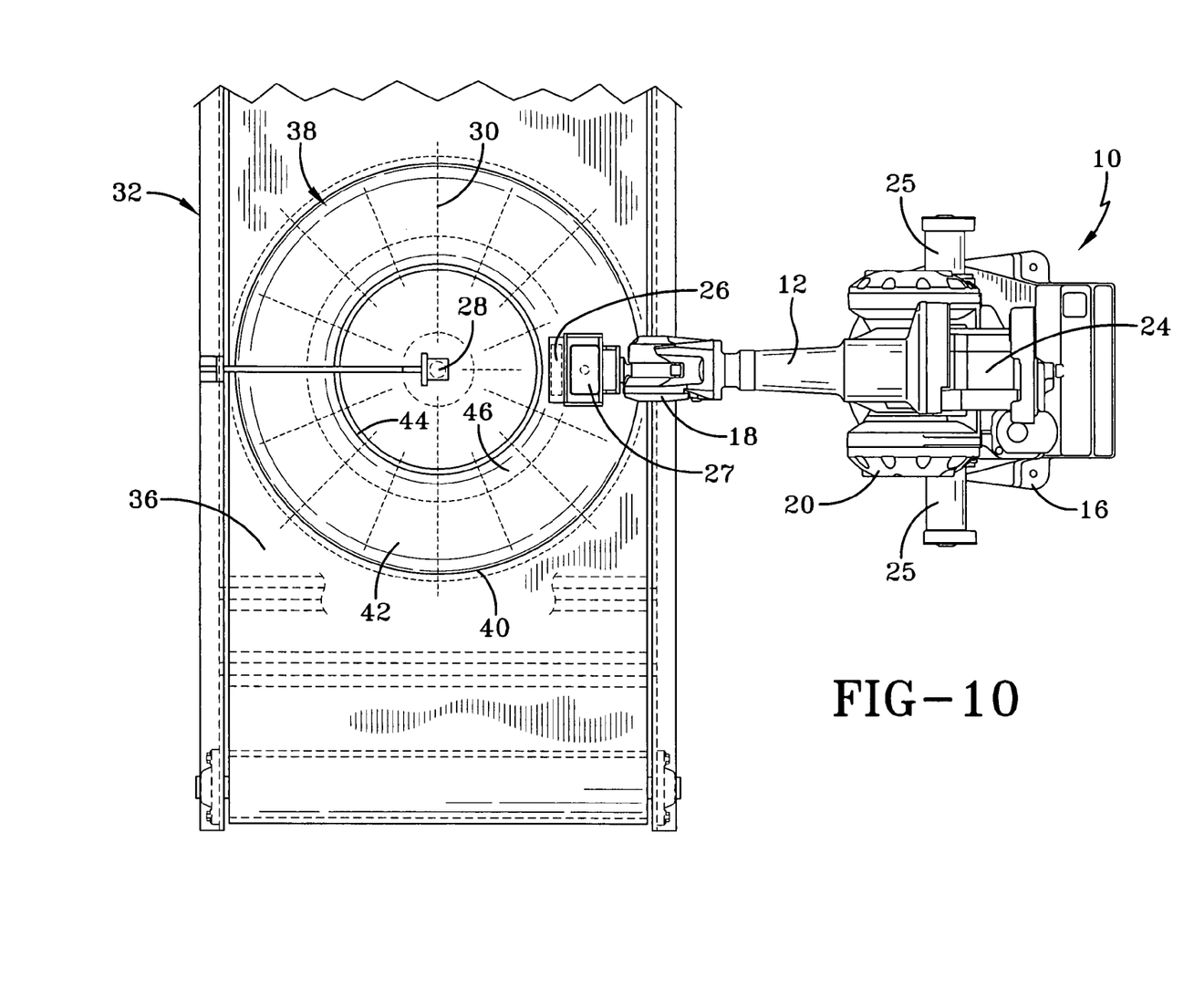
FIG. 10 is a top plan view of the workstation showing the laser measuring device in an operative orientation to the tire.
Figure 11:
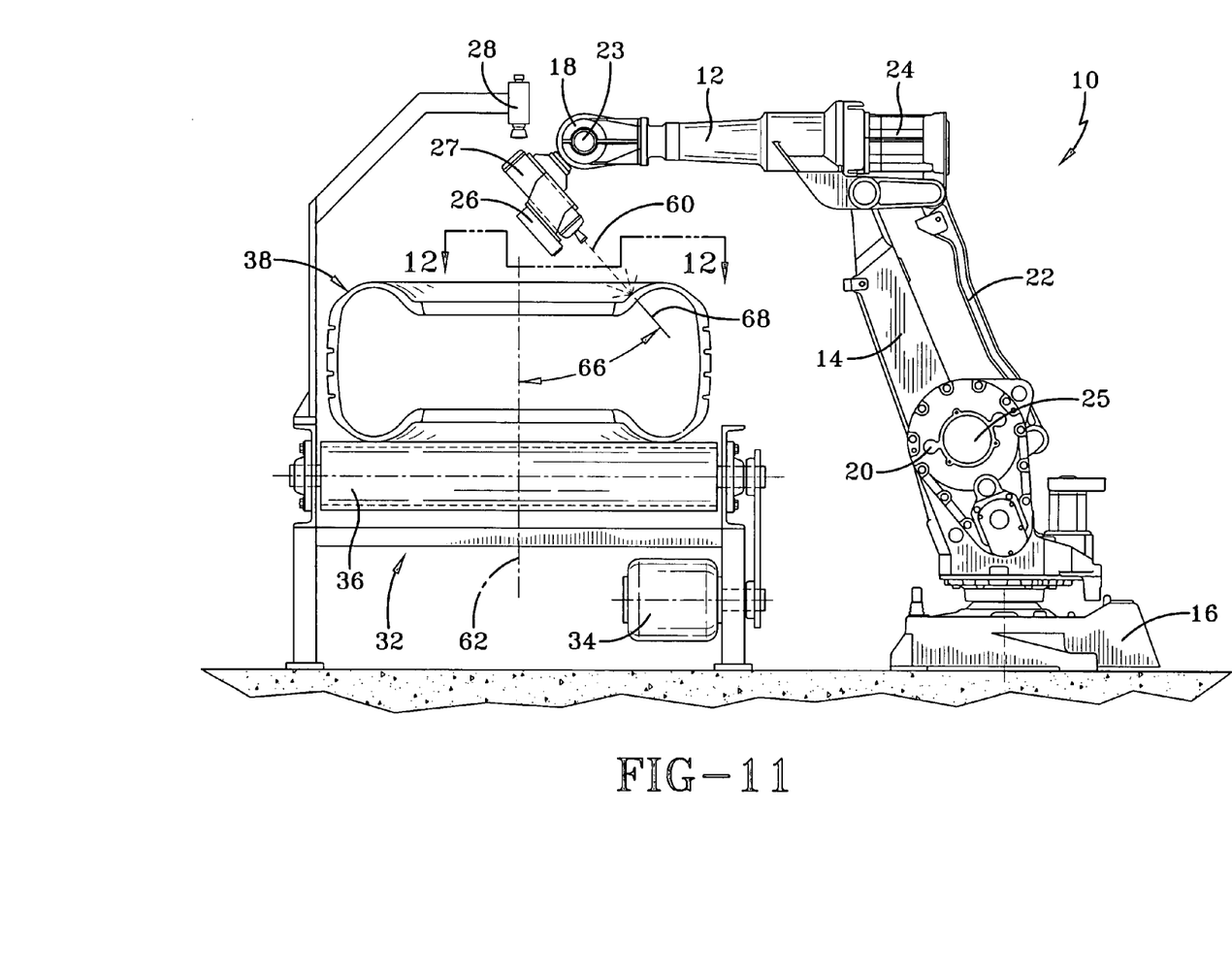
FIG. 11 is an end elevation view of the workstation showing the laser engraving device in an operative orientation to the tire.
Figure 13:
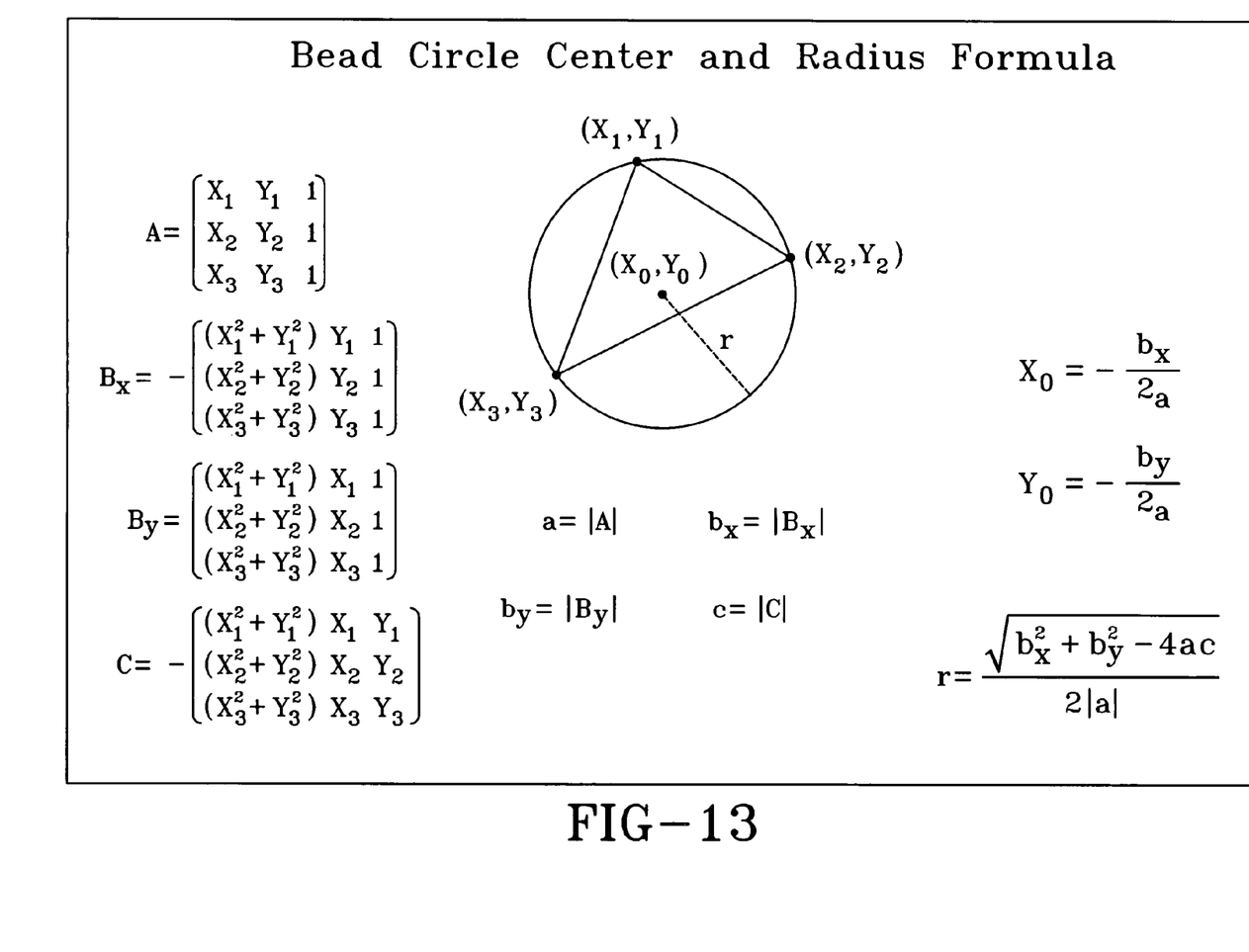
FIG. 13 is a bead circle center and radius formula utilized in identifying three-dimensional coordinates on a tire.

When a plurality, and specifically a minimum of three, image pixels on the tire bead edge are found, conventional geometric formulas such as illustrated in FIG. 13 may be used to calculate the bead circle's center and radius 64 (FIG. 9). The diagram and formulas of FIG. 13 are taken from ref: Pedoe, D. (1995). Circles: A Mathematical View. The bead circle's center and radius are then used to perform a pixel by pixel search (360-degree sweep following the bead circle region) around the bead circumference. The target region is located by differentiating the pixel brightness values of the target (date code) region from the surrounding black tire. The coordinates of the bead circle center and target region are sent from the data processor to the robotic controller (RC) of the robotic apparatus. The RC moves the LDM to a position above the target region as shown in FIG. 9.

The LDM laser 26 measures the distance D1 from the LDM to a first point P1 within the target region and sends the distance data to the RC. The RC then moves the LDM to a second location above the target region along a line through the bead circle center. Distance D2 to a second point P2 within the target region is then determined by the LDM. The second point will lie on a line from the center of the bead circle through the first point P1. The LDM sends the new distance D2 to the second point P2 in the target region to the RC. The RC calculates the target region's slope with respect to horizontal from the difference between distances D1 and D2.

The RC, after calculating the slope of the target region, now has the set of full 3-D coordinates and orientation of the target region. Two dimensions are determined by the pixel brightness value scan and the third dimension determined by the LDM measurements. From the 3D coordinates, a preferred angle of attack (AOA) is calculated by the RC for the purposes of aiming an engraving laser at the target region. The RC sends control signals to the robot that aims the engraving laser 27 along an optimal laser line of attack 68 toward the target region. The line of attack 68 is perpendicular to the slope line of the region 48 as determined above.

Figure 1:
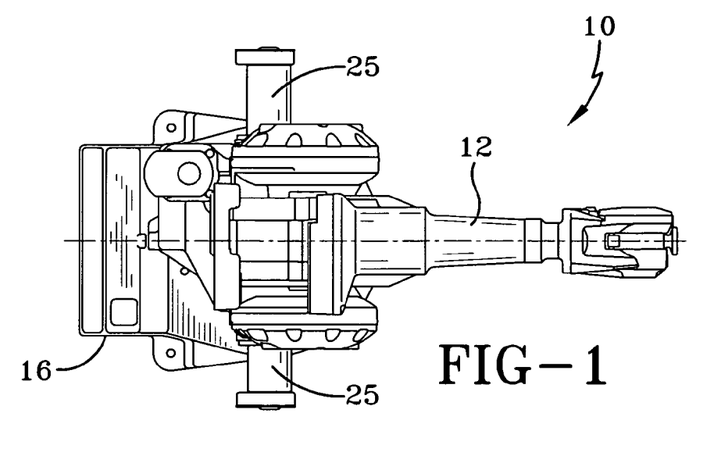
FIG. 1 is a top plan view of a robotic apparatus for directing a laser distance-measuring device pursuant to the invention.
Figure 2:
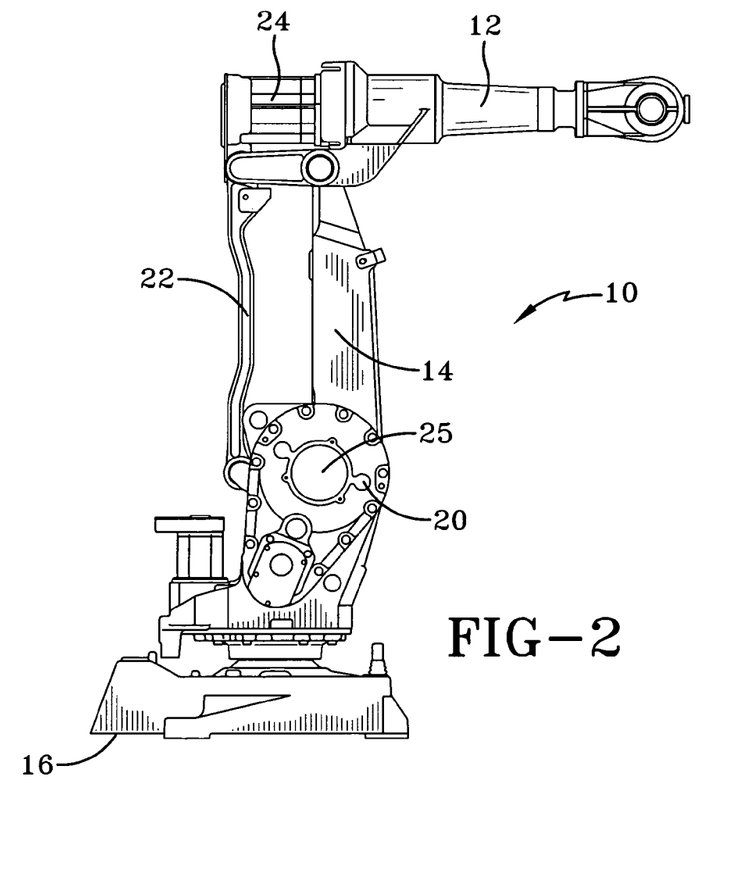
FIG. 2 is a side elevation view thereof.
Figure 3:
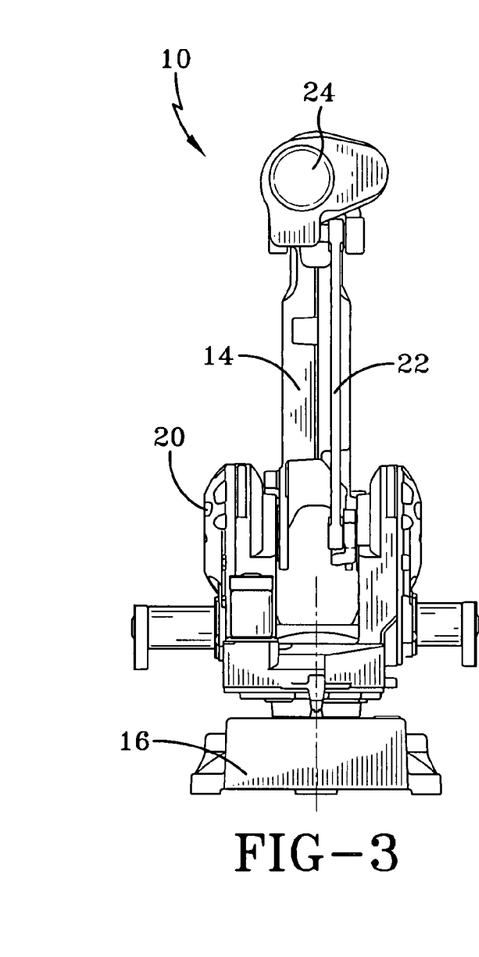
FIG. 3 is a front elevation view thereof.
Figure 4:
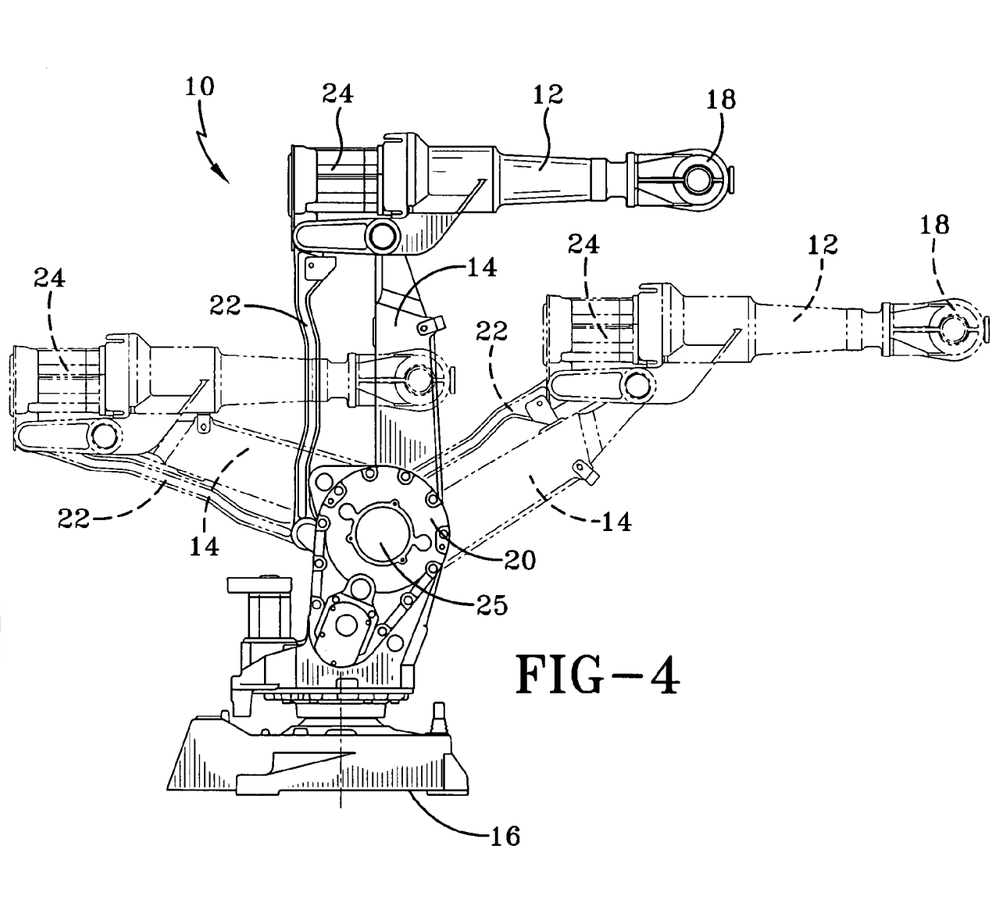
FIG. 4 is a side elevation view thereof showing in phantom alternative orientations of the robotic apparatus.
Figure 5:
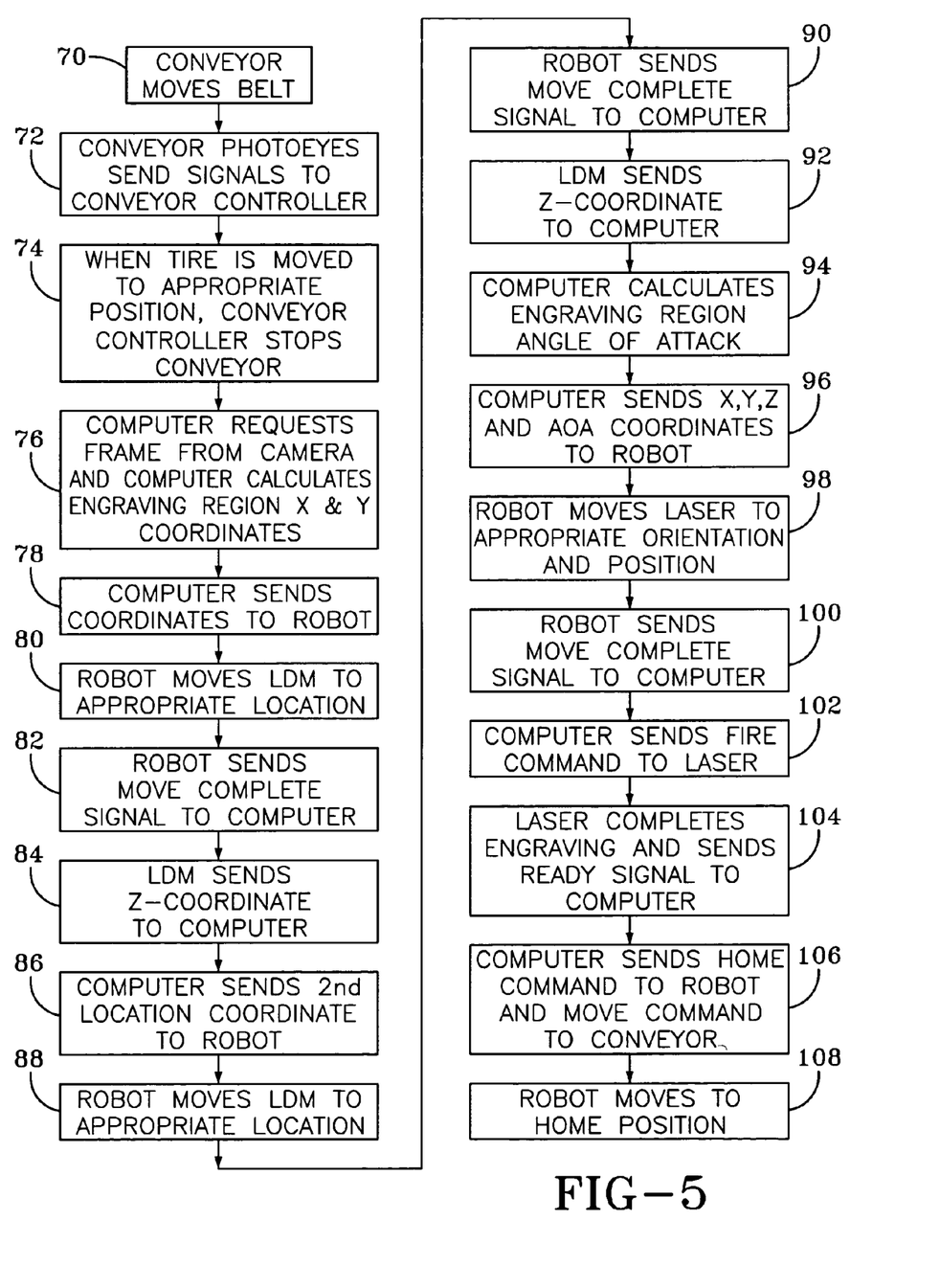
FIG. 5 is a block diagram for the method of identifying 3-D coordinates of a target tire region pursuant to the invention.

The block diagram of FIG. 5 illustrates the method of the invention in more detail. As shown therein, the conveyor moves the belt (70); the conveyor photoeyes send signals to the conveyor controller (72) and when a tire is moved to appropriate position, the conveyor controller stops the conveyor (74). A data processing computer calculates the target region X, Y coordinates from the pixel brightness sweep along the bead region (76) and sends coordinates to the robotic apparatus (78). The robotic apparatus moves the LDM to appropriate location (80) and sends a move complete signal to the computer (82). The LDM sends Z-coordinate for point P1 to the computer (84) and the computer then sends the second location P2 coordinates to the robot apparatus (86). The robotic apparatus moves the LDM to the second coordinate location (88) and the robot sends move complete signal to the computer (90). The LDM sends Z-coordinate to the computer for the second position P2 (92). The computer calculates the 3D coordinates of the target region and a preferred angle of attack (94). The computer sends X, Y, Z and AOA coordinates to the robotic apparatus (96), the laser 27 is moved to appropriate position (98), and a move complete signal is returned to the computer (100). The computer sends a fire command to the laser (102) and the laser completes engraving and sends a ready signal to the computer (104). The computer sends home command to the robotic apparatus and a move command to the conveyor (106). The robotic apparatus moves to the home position (108) and the cycle may be repeated.

From the foregoing, it will be appreciated that the subject invention provides an effective method and apparatus for identifying 3-D coordinates of a target region on a tire for subsequent laser engraving. The method and apparatus function quickly, effectively, and efficiently in locating the 3-D coordinates of the tire region to be engraved.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An apparatus for determining coordinates of a target region in a tire comprising:

means for generating a tire digital image;

means for finding the edge of a tire bead from the tire image using pixel brightness values from the tire image;

means for calculating a tire bead circle center and radius using a plurality of image pixels on the tire bead edge; and means for performing a pixel brightness search around the bead circumference using the bead circle's center and radius to identify by pixel brightness differentiation the target region X, Y coordinates on the tire;

wherein the means determining the slope of the target area comprises:

a distance-measuring device locatable at a first position (P1) above the target region using X, Y coordinates of the target region;

the distance-measuring device measuring the distance D1 from the distance-measuring means to a first location (P1) in the target region;

the distance-measuring device being locatable to a second position above a second location (P2) in the target region along a line through the bead circle center and measuring the distance (D2) from the distance measuring device (P2), the target region slope with respect to horizontal being derived from the distances (D1) and (D2) at positions (P1 and P2).

* * * * *

UNITED STATES PATENT AND TRADEMARK OFFICE
CERTIFICATE OF CORRECTION

PATENT NO. : 7,702,134 B2  Page 1 of 1
APPLICATION NO. : 11/292989
DATED : April 20, 2010
INVENTOR(S) : McAllister Daniel, Jr.

It is certified that error appears in the above-identified patent and that said Letters Patent is hereby corrected as shown below:

On the Title page, item [75] Inventor: delete "Daniel McAllister, Jr., Akron, OH (US)" and replace with --McAllister Daniel, Jr., Akron, OH (US)--

Signed and Sealed this

Seventh Day of December, 2010

David J. Kappos
*Director of the United States Patent and Trademark Office*